United States Patent Office 3,264,483
Patented August 2, 1966

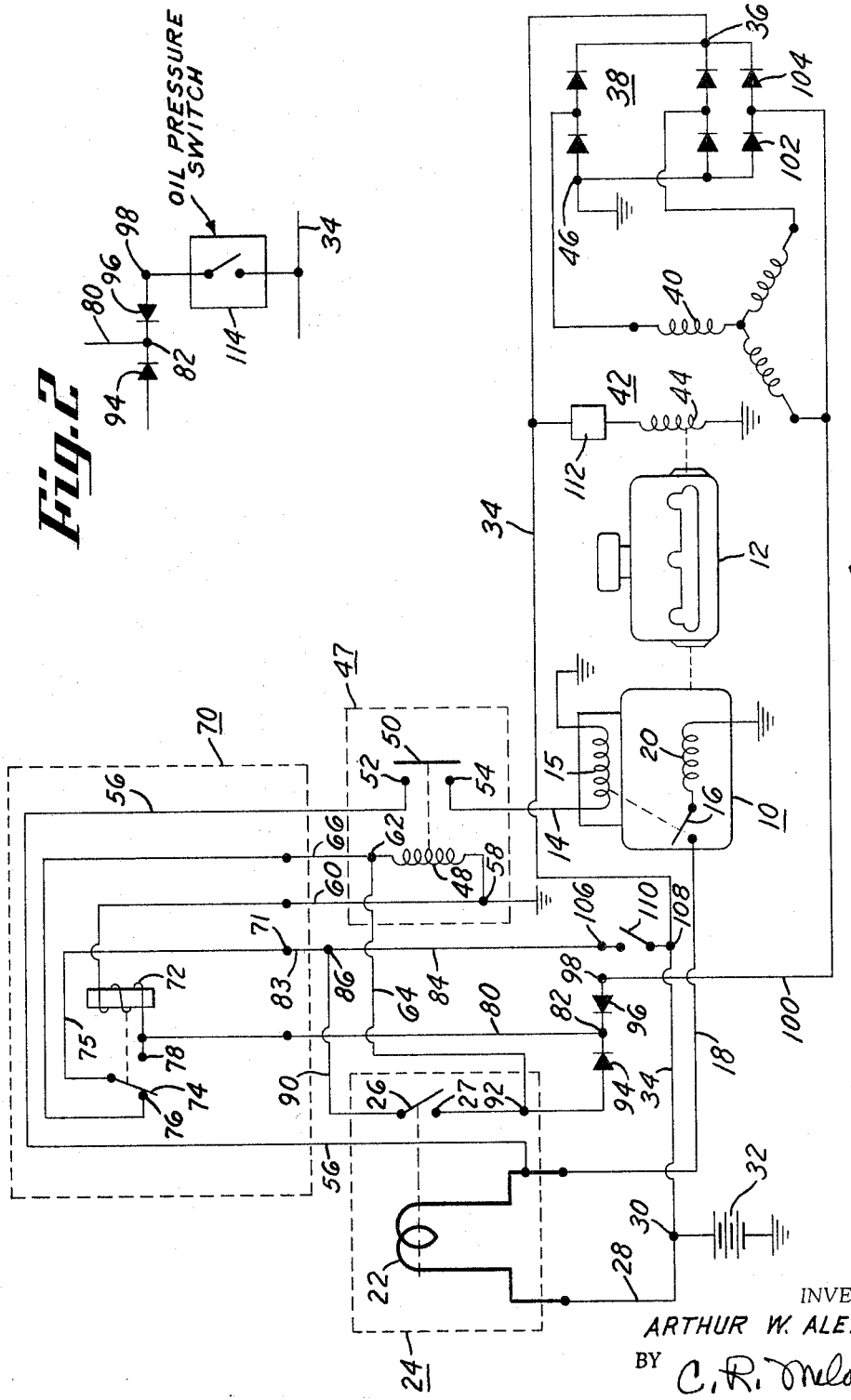

3,264,483
CONTROL SYSTEM FOR ELECTRIC
CRANKING MOTORS
Arthur W. Alexander, Anderson, Ind., assignor to General
Motors Corporation, Detroit, Mich., a corporation of
Delaware
Filed Sept. 26, 1963, Ser. No. 311,870
7 Claims. (Cl. 290—38)

This invention relates to control systems for electric cranking motors that are used to crank an internal combustion engine and more particularly to a control system which is capable of deenergizing the electric motor automatically when the internal combustion engine starts.

The present invention is concerned with protecting the electric cranking motor from being damaged under conditions where the cranking motor is not disconnected from the engine when the engine starts.

One of the objects of this invention is to provide a control circuit for controlling the energization of an electric cranking motor wherein the amount of current that is supplied to the electric cranking motor is used as a signal to control the energization of the electric cranking motor. In carrying this object forward, a current relay is provided which has a coil winding connected between a source of direct current and the electric cranking motor. When the current flow through this coil winding is greater than a predetermined magnitude, it indicates that the engine has not started and this signal current therefore is used to maintain the circuit to the starting motor in an energized condition. On the other hand, when the current drops in the coil winding of the current relay when a cranking operation is taking place, it indicates that the engine has started and a switching action is set into motion which deenergizes the electric motor to prevent an overrunning condition between the engine and the electric cranking motor.

Still another object of this invention is to provide a control circuit for an electric cranking motor that includes the above-mentioned current operated relay and which also includes a lock out relay energized when the engine is running to prevent an inadvertent energization of the electric cranking motor when the engine is running. In carrying this object forward, the signal which indicates that the engine is running can be taken from a generator or can be supplied by other means, for example, an oil pressure switch which closes when the engine is running.

Another object of this invention is to provide a control circuit for an electric cranking motor of the type described above which includes diodes for interconnecting the various components of the control system.

Further objects and advantages of the present invention will be apparent from the following description, reference being had to the accompanying drawings wherein preferred embodiments of the present invention are clearly shown.

In the drawings:

FIGURE 1 is a schematic circuit diagram of an electric cranking motor control system made in accordance with this invention.

FIGURE 2 illustrates a modified method of providing a control signal to the cranking motor control circuit when the engine is running.

Referring now to the drawings and more particularly to FIGURE 1, the reference numeral 10 generally designates an electric cranking motor which is adapted to crank an engine 12 to start the engine. The electric cranking motor 10 is of a type which has a solenoid 15 that shifts a pinion into mesh with a ring gear when the solenoid 15 is energized. The solenoid 15 is shown as having only one winding but it will be appreciated by those skilled in the art that it could have a hold-in and a pull-in winding. One side of the winding 15 is grounded and the opposite side of the solenoid winding 15 is connected with conductor 14.

The solenoid winding 15 in addition to shifting a pinion into mesh with a ring gear operates a switch 16 which controls the connection of conductor 18 with the windings 20 of the electric cranking motor. One side of the windings 20 are grounded and the winding 20 is intended to designate both the field and armature windings of the cranking motor 10. The electric cranking motor may be similar in construction to that shown in the Redick et al. Patent, 3,020,771.

The conductor 18 is connected to one side of a coil winding 22 of a current relay generally designated by reference numeral 24. This current relay includes a normally open contact 26 which can be spring biased to its normally open position and which is closed whenever a sufficient current flows through the coil winding 22. The opposite side of the coil winding 22 is connected with conductor 28 and this conductor is connected with a junction 30. The junction 30 is connected to one side of a battery 32, the opposite side of this battery being grounded.

The battery 32 receives charging current from a conductor 34 which is connected with the positive D.C. output terminal 36 of a three phase full wave bridge rectifier 38. The A.C. input terminals of the bridge rectifier 38 are connected with a three-phase Y-connected output winding 40 of an alternating current generator designated by reference numeral 42. This generator has a field winding 44 which is rotatably driven by the engine 12. The negative D.C. output terminal 46 of the bridge rectifier 38 is grounded as shown. It will be appreciated by those skilled in the art that the alternating current generator and the diodes that make up the bridge rectifier 38 can be built into one unit which forms a diode-rectifier alternating current generator having D.C. output terminals 36 and 46.

The cranking motor control system of this invention has a magnetic switch or relay generally designated by reference numeral 47. This magnetic switch or relay includes a coil winding 48 which operates a contactor 50. The contactor 50 can connect the fixed contacts 52 and 54 but this contactor 50 is normally out of engagement with contacts 52 and 54 until the relay coil 48 is energized. It is seen that the fixed contact 54 of the magnetic switch 47 is connected with conductor 14. The fixed contact 52 is connected with a conductor 56 which is connected to one side of relay coil 22. One side of the relay coil 48 is connected with a junction 58 and this junction is connected to ground and to a conductor 60. The opposite side of relay coil 48 is connected with a junction 62 and this junction is connected with conductors 64 and 66.

The control system of this invention further includes a lock-out relay generally designated by reference numeral 70. This relay has an actuating coil 72 and a movable contactor 74 which can engage either the fixed contact 76 or the fixed contact 78. The relay 70 is designed such that contact 74 normally engages the fixed contact 76 but is pulled into engagement with the fixed contact 78 when the relay coil 72 is energized.

One side of the relay coil 72 and the fixed contact 78 are connected with a conductor 80 which in turn is connected with junction 82. The movable contactor 74 is connected with conductors 75, 82 and 84 and with a junction 86. One side of the coil winding 72 is connected with conductor 60 as is clearly apparent from the drawing. The fixed contact 76 of the lock-out relay 70 is connected with conductor 66.

The contact 26 of the current relay 24 is connected with junction 86 via a conductor 90. The fixed contact 27 of the current relay 24 is connected with junction 92. The junction 92 is connected to one side of a diode 94, the opposite side of this diode being connected with junction 82. The junction 92 is also connected with conductor 64. A diode 96 is connected between junctions 82 and 98.

The junction 98 is adapted to be connected with some device that will produce a signal when the engine 12 is running. In FIGURE 1, the signal to the junction 98 is provided by a conductor 100 which is connected between two diodes 102 and 104 of the bridge rectifier 38. As will become more readily apparent hereinafter, the voltage developed between conductor 100 and ground is used as a signal voltage for the system to indicate that the engine 12 has been started.

The conductor 84 is connected with a terminal or junction 106. The terminal or junction 106 can be connected with junction 108 on conductor 34 by means of a manually operable starter switch 110.

The field winding 44 of the generator 42 is energized between conductor 34 and ground through any conventional voltage regulator 112 which forms no part of the present invention.

Referring now to FIGURE 2, a modified arrangement is illustrated for applying a signal voltage to the terminal 98 which indicates that the engine 12 is running. It will be appreciated that FIGURE 2 illustrates a portion of the system shown in FIGURE 1 and includes an oil pressure switch 114 which is connected between conductor 34 and the junction 98. The oil pressure switch 114 is connected into the lubricating system of the engine 12 and when the engine 12 is running, the pressure in the oil pressure system is sufficient to close the oil pressure switch 114. When the engine is not running, the oil pressure switch remains open.

The operation of the electric cranking motor control system will now be described. When the operator of a motor vehicle desires to crank the engine 12 to start it, the manually operable switch 110 is closed. When switch 110 is closed, the relay coil 48 will be energized from a circuit that can be traced from junction 30, through conductor 34, through junction 108, through the closed switch 10, through junction 106, through conductor 84, through conductor 83, through junction 71, through conductor 75, through the engaged contacts 74 and 76, through conductor 66, through junction 62, through relay coil 48, and then through the junction 58 to ground. When the relay coil 48 of magnetic switch 47 is energized from the circuit just described, the contact 50 connects contacts 52 and 54. This causes an energization of the starter solenoid coil 15 through a circuit that can be carried from conductor 28, through relay coil 22, through conductor 56, through contactor 50, through conductor 14 and then through the solenoid coil 15 to ground. The energization of the solenoid coil 15 shifts the pinion of the starter 10 into engagement with the ring gear of the engine 12 and then causes the switch 16 to close. When switch 16 closes, the windings 20 of the motor are energized through a circuit that can be traced from junction 30, through conductor 28, through the relay coil 22, through conductor 18, through the closed switch 16 and through the motor windings 20 to ground. The engine 12 will now be cranked by the starting motor 10.

As the starting motor 10 begins to crank the engine 12, it is under a heavy load and as a result of this, a large current flows through the motor windings of the starting motor 10 and through the relay coil 22. This current is sufficient to cause the contactor 26 to engage the fixed contact 27 of the current relay 24. When the contactor 26 engages the fixed contact 27, another circuit is completed for the relay coil 48 which can be traced from junction 108, through the closed switch 110, through junction 106, through conductors 84 and 90, through contacts 26 and 27, through junction 92, through conductor 64 to the junction 62 which is connected to one side of relay coil 48. The closure of contacts 26 and 27 also completes a circuit for energizing the relay coil 72. This circuit can be traced from junction 108, through closed switch 110, through junction 106, through conductors 84 and 90, through closed contacts 26 and 27, through diode 94, through junction 82, through conductor 80, through relay coil 72 to conductor 60, and then through the grounded junction 58. The energization of relay coil 72 via the circuit just described causes the contactor 74 to shift out of engagement with contact 76 and into engagement with the fixed contact 78.

When contactor 74 engages contactor 78, the circuit through conductor 66 for relay coil 48 is broken but this circuit is maintained by the closed contacts 26 and 27 of the current operated relay 24. It will be appreciated that the closing of contacts 26 and 27 has broken one circuit for the relay coil 48 but has made another circuit for this relay coil.

As the starting motor 10 is now cranking the engine, the time will come when the engine will start. When this happens, the current supplied to the electric starting motor 10 drops considerably and drops to a point where the current flowing through the relay coil 22 can no longer maintain the contacts 26 and 27 engaged. These contacts 26 and 27 therefore open when the current flow through the coil winding 22 reduces which is an indication that the engine 12 has started.

When the engine starts, the generator 42 develops an output voltage since it is driven by the engine and a signal is obtained between conductor 100 and ground which is an indication that the engine has started.

With a signal voltage being developed between conductor 100 and ground due to the fact that the engine is running and the generator 42 is being driven, the relay coil 72 is energized from conductor 100, through junction 98, through diode 96, through junction 82, through conductor 80, through relay coil 72, through conductor 60, and then through junction 58 to ground. This circuit will now maintain the relay coil 72 energized which will therefore cause the contactor 74 to remain in engagement with the contact 78.

As pointed out above, when the engine starts, the contacts 26 and 27 open and a signal voltage is developed between conductor 100 and ground. The effect of the signal voltage has just been described. The effect of the opening of contacts 26 and 27 is to break the circuit between conductor 90 and conductor 64 so that the relay coil 48 can no longer be energized by this circuit. In addition, the opening of contacts 26 and 27 breaks one circuit for relay coil 72 which was via diode 94, junction 82 and conductor 80. It will be appreciated, however, that this relay coil is still energized because of the signal applied to junction 98 from conductor 100.

With the engine running and the generator being driven and a signal being developed between conductor 100 and ground, the relay coil 72 remains energized holding the contact 74 in engagement with contact 78 and therefore locking out any operation or energization of the starting motor 10.

When ignition power is removed from the engine 12 or where it is otherwise shut down, the relay coil 72 will no longer be energized since there will be no output voltage from generator 42 and the contact 74 will therefore move back into engagement with contact 76 and the system is now ready for another cranking operation when it is desired to crank and once more start the engine 12.

Instead of using the signal voltage between conductor 100 and ground that is developed in accordance with generator operation, it is possible to provide other means which indicate that the engine is running for energizing the relay coil 72 from junction 98 and through diode 96. The other means may take the form of an oil pressure switch 114 shown in FIGURE 2 which would be closed whenever the engine 12 was running. When switch 114 is closed in the modified embodiment of FIGURE 2, current would be supplied to the relay coil 72 from the positive conductor 34 of the charging system. In such an arrangement, the conductor 100 of course would not be required and no connection would be made between diodes 102 and 104 for controlling the starting motor.

It is pointed out that once the contacts 26 and 27 have closed to energize the relay coil 48 and the relay coil 72, the manually operable switch 110 when in a closed position will have no further effect on the operation of the system. Thus once the relay coil 72 has been energized to close contacts 74 and 78, the manually operable switch 110 forms part of a holding circuit for the coil 72 which prevents the contacts 74 and 76 from reclosing to thereby prevent any possible energizing of the starting motor 10 even if the switch 110 remains closed when the engine starts. When the switch 110 is opened in the normal manner after the engine starts, the signal which is applied to junction 98 energizes the relay coil 72 to prevent energization of the starting motor 10.

While the embodiments of the present invention as herein disclosed constitute a preferred form, it is to be understood that other forms might be adopted.

What is claimed is as follows:

1. A control circuit for an electric starting motor comprising, an engine, an electric starting motor for cranking said engine, a source of direct current, a magnetic switch including a coil winding and switch contacts, a manually operable switch, means electrically connecting the switch contacts of said magnetic switch in series between said source of direct current and said electric starting motor, a current relay having a coil winding and switch contacts, means connecting the coil winding of said current relay with said electric starting motor and said source of direct current whereby said relay responds to the magnitude of current flowing between said source of direct current and said starting motor, a lock out relay including a coil winding and switch contacts, means connecting said manually operable switch, the contacts of said lock out relay and the coil winding of said magnetic switch across said source of direct current, means connecting the contacts of said current relay with the coil winding of said magnetic switch and with the coil winding of said lock out relay, means providing a signal voltage when said engine is running, and a circuit for coupling said signal voltage to the coil winding of said lock out relay.

2. In combination, an engine, an electric starting motor for cranking said engine, a source of direct current, a manually operable switch, a lock out relay having a coil winding, a movable contact, and a pair of fixed contacts, a magnetic switch having a coil winding and switch contacts, a current relay having a coil winding and switch contacts, means connecting said manually operable switch, one of the fixed contacts and the movable contact of said lock out relay and the coil winding of said magnetic switch across said source of direct current, means connecting the contacts of said magnetic switch in controlling relationship with said electric starting motor, means connecting the coil winding of said current relay between said source of direct current and said electric starting motor, means connecting the contacts of said current relay in circuit with said manually operable switch, in circuit with the coil winding of said magnetic switch and in circuit with the coil winding of said lock out relay, means connecting the other fixed contact of said lock out relay with one side of the coil winding of said lock out relay and with a junction, a first diode connected between the contacts of said current relay and said junction, a second diode connected with said junction, and means connected with an opposite side of said second diode for providing a signal voltage when said engine is running.

3. In combination, an engine, an electric starting motor for cranking said engine, a source of direct current, an electrically controlled switching means operative to control the connection of said source of direct current and said electric cranking motor, a junction connected to feed said electrically controlled switch means, a means for producing a first signal current in accordance with the magnitude of current flowing between the source of direct current and said electric starting motor, a means for providing a second signal current when said engine is running, a first diode for coupling said first signal current to said junction, and a second diode for coupling said second signal current to said junction.

4. The control system according to claim 3 wherein the means for providing the first signal current is a current relay having switch contacts connected with one side of said first diode and having a coil winding connected in series between the source of direct current and the electric starting motor.

5. The control system according to claim 3 wherein the means for providing the second signal current is a generator driven by the engine.

6. The control system according to claim 3 wherein the means for providing the second signal current is an alternating current generator which feeds a bridge rectifier and wherein said second signal current is taken across one of the diodes of the bridge rectifier.

7. In combination, an engine, an electric starting motor for cranking said engine, a manually operable switch, a magnetic switch including a coil winding and switch contacts, a source of direct current, means connecting said switch contacts of said magnetic switch between said source of direct current and said starting motor, a lock-out relay having a coil winding, a movable contact and first and second fixed contacts, a current relay having a coil winding and switch contacts, means connecting said coil winding of said current relay in series between said source of direct current and said starting motor, said switch contacts of said current relay being closed when a predetermined current is being supplied to said starting motor from said source of direct current through said coil winding of said current relay, a first circuit for energizing said coil winding of said magnetic switch from said source of direct current including said manually operable switch and said movable contact and first contact of said lock-out relay, a second circuit for energizing said coil winding of said magnetic switch from said source of direct current including said manually operable switch and said contacts of said current relay, said contacts of said current relay when closed forming part of a circuit for energizing said coil winding of said lock-out relay through said manually operable switch, said lock-out relay when energized shifting said movable contact into engagement with said second contact of said lock-out relay, means connecting said coil winding of said lock-out relay between said second contact of said lock-out relay and one side of said source of direct current, and means for maintaining the coil winding of said lock-out relay energized in response to a running condition of said engine.

References Cited by the Examiner

UNITED STATES PATENTS

| | | |
|---|---|---|
| 1,908,088 | 5/1933 | Warner. |
| 1,996,521 | 4/1935 | Maurer. |
| 2,001,479 | 5/1935 | Watson. |
| 2,016,818 | 10/1935 | Maurer. |
| 2,121,974 | 6/1938 | Loehr et al. |
| 2,131,403 | 9/1938 | Loehr et al. |
| 2,202,550 | 5/1940 | Elkin. |
| 3,163,769 | 12/1964 | Keuchen et al. _____ 290—38 |

ORIS L. RADER, *Primary Examiner.*

G. SIMMONS, *Assistant Examiner.*